Patented Nov. 17, 1931

1,832,236

UNITED STATES PATENT OFFICE

PAUL NAWIASKY, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

PRODUCTION OF VAT DYESTUFFS OF THE N-METHYL ACRIDINE ANTHRONE NAPHTHOQUINONE SERIES

No Drawing. Application filed November 9, 1927, Serial No. 232,198, and in Germany November 18, 1926.

In the U. S. Patent No. 995,936, there is described a process for the production of vat dyestuffs which consists in treating benzanthronyl-1-aminoanthraquinone or its derivatives with condensing agents.

I have now found that other vat dyestuffs are obtained by treating with alkaline agents derivatives of benzanthronyl-1-aminoanthraquinone which have been alkylated on the nitrogen atom. These may be obtained for example by condensing 1-alkyl-aminoanthraquinones with halogenbenzanthrones and also by alkylating the benzanthronyl-1-aminoanthraquinones obtained from 1-aminoanthraquinone and halogenbenzanthrones. The condensation of the N-alkyl derivatives proceeds generally speaking at a substantially lower temperature than that of the non-alkylated products. The dyestuffs which, disregarding for the moment any substituents that may be present in the benzanthrone and anthraquinone radical, correspond probably to the general formula:

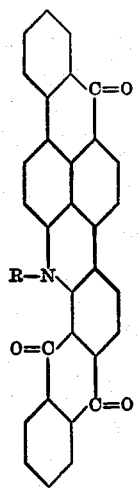

(in which R represents alkyl).

possess in many cases, a higher degree of purity than those obtained from the non-alkylated compounds.

The following example will further illustrate how the said invention may be carried into practical effect but the invention is not limited to this example. The parts are by weight.

*Example*

2 parts of the N-methyl-derivative (melting point 281 to 283° centigrade) obtainable by methylating Bzl'-benzanthronyl-1-aminoanthraquinone are introduced into a melt of 10 parts of caustic potash and 80 parts of alcohol, at about 98° centigrade and the mixture is stirred for about an hour at the same temperature. The mass is then poured into water and warmed, air being passed through until complete separation of the dyestuff is obtained. The product is filtered off and finished in the usual manner. The dyestuff is a dark powder which dissolves to a brown solution, with a reddish tinge, in concentrated sulfuric acid and gives violet dyeings on cotton from a vat of the same color. On oxidation in the air, this color turns blue-green, substantially purer than that obtainable with the dyestuff according to Example 1 of the Patent No. 995,936.

Dyestuffs may be obtained in a similar manner from other N-alkyl derivatives or substitution products thereof as initial materials.

What I claim is:

1. As new article of manufacture the vat dyestuff of the probable formula:

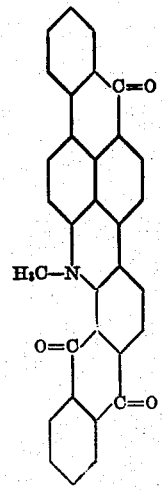

which dyestuff is a dark powder and dissolves in concentrated sulfuric acid to a brown solution, with a reddish tinge, and dyes cotton from a violet vat violet shades which turn blue-green on exposure to air.

2. The process of producing a new vat dyestuff which consists in treating N-methyl-Bz-1'-benzanthronyl-1-aminoanthraquinone with caustic alkali.

In testimony whereof I have hereunto set my hand.

PAUL NAWIASKY.